Patented May 26, 1936

2,041,829

UNITED STATES PATENT OFFICE 2,041,829

AZO-DYESTUFFS

Joseph Gyr and Otto Kaiser, Basel, Switzerland, assignors to Society of Chemical Industry in Basle, Basel, Switzerland No Drawing. Application December 10, 1932, Serial No. 646,707. In Switzerland December 17, 1931

3 Claims. (Cl. 260—27)

In U. S. Patent No. 1,667,312, Example 14, there is described a direct dyeing green polyazo-dyestuff, which can be made by the action of the diazotized azo-dyestuff from 1-diazo-8-hydroxynaphthalene-3:6-disulfonic acid and cresidine on 1 mol. of the ternary condensation product from 1 mol. cyanuric chloride, 1 mol. 1-amino-8-hydroxynaphthalene-3:6-disulfonic acid, 1 mol. 4'-amino-4-hydroxyazobenzene-3-carboxylic acid and 1 mol. aniline. This dyestuff is characterized by the beauty and the outstanding fastness to light of the dyeings on cotton which can be obtained by its use. It has, however, the disadvantage that it is sensitive to calcium carbonate, so that when hard water is used in the dyeing operation enfeebled dyeings may easily be produced.

The present invention relates to green, direct dyeing azo-dyestuffs fast to light which, on the one hand, are insensible in the dye-bath towards hard water, and, on the other hand, correspond to the general formula

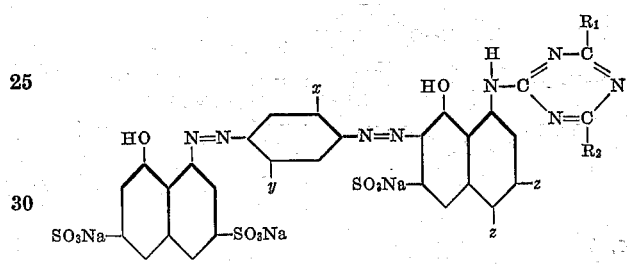

in which one $z$ represents an $SO_3Na$-group and the other $z$ a hydrogen atom, $y$ and $x$ alkyl or alkoxy, $R_1$ the radical of an amino compound containing at least one alkyl-group bound to the nitrogen, and $R_2$ the radical of a yellow aminoazo-dyestuff stands for hydrogen, alkyl radicals or aryl radicals of the benzene or of the naphthalene series, $R_2$ for hydrogen or alkyl, and $R_3$ and $R_4$ for aryl radicals of the benzene series. Such dyestuffs are obtained by causing to react with each other, in known manner and in suitable sequence, 1 mol. of the diazotized azo-dyestuff from 1-diazo-8-hydroxynaphthalene-3:6-disulfonic acid (if desired in the form of an O-acyl ester) and a middle component of the general formula

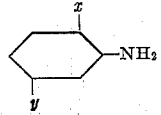

(in which $y$ and $x$ represent akyl or alkoxy), 1 mol. of a 1-amino-8-hydroxynaphthalene-3:6- or 4:6-disulfonic acid, 1 mol. cyanuric chloride, 1 mol. of a yellow aminoazo-dyestuff and 1 mol. of a compound containing a primary or secondary amino-group and at least one alkyl-group bound to the nitrogen, and, if desired, treating the product thus obtained with a saponifying agent.

The following example illustrates the invention, the parts being by weight:—

Example 621 parts of the dyestuff obtainable by coupling 1 mol. diazotized 1-amino-8-hydroxynaphthalene-4'-toluenesulfonic acid-ester-3:6-disulfonic acid and 1 mol. 3-amino-4-cresolmethyl ether are diazotized and the product is introduced into a cooled ammoniacal solution or solution containing pyridine of 758 parts of the ternary condensation product from 1 mol. cyanuric chloride, 1 mol. 1-amino-8-hydroxynaphthalene-3:6-disulfonic acid, 1 mol. 4-amino-4'-hydroxyazobenzene-3'-carboxylic acid and 1 mol. mono-methylaniline. When coupling is complete the whole is heated to 85° C. and at this temperature the toluene sulfonic acid residue is split off by the addition of caustic soda solution. The dyestuff is salted out and dried. It dyes cotton in a dyebath made with either soft water or hard water, full green tints. The new dyestuff in the form of its sodium salt corresponds very probably with the formula It is suitable for dyeing various kinds of artificial silk from regenerated cellulose, such as viscose or copper silk.

The following table gives a number of further examples of dyestuffs obtainable in accordance with the invention and their properties:

| | Initial component | Middle component | | Condensation product of 1 mol. cyanuric chloride with 1 mol. each of: | |
|---|---|---|---|---|---|
| (1) | 1-amino-8-hydroxy-naphthalene - 3:6 - disulfonic acid | 1-methyl-3-amino-4-methoxy-benzene | 1-amino-8-hydroxy-naphthalene-3:6-disulfonic acid | 4-amino-4'-hydroxyazo-benzene-3'-carboxylic acid | Monomethylamine. |
| (2) | Do | do | do | do | Diethylamine. |
| (3) | Do | do | do | do | Monomethylaniline. |
| (4) | Do | do | do | 4-amino-3'-methyl-4'-hydroxyazo-benzene-5'-carboxylic acid | Do. |
| (5) | Do | do | do | 4-amino-azobenzene | Do. |
| (6) | Do | do | do | 4-amino-3-methoxyazo-benzene-3'-sulfonic acid | Do. |
| (7) | Do | do | do | 4 - amino - 4' - hydroxy - azobenzene | Do. |
| (8) | Do | do | do | 4 - amino - 2' - hydroxy - 5'-methylazo-benzene | Do. |
| (9) | Do | do | do | 4 - amino - 4' - hydroxy - 3'-methylazo-benzene | Do. |
| (10) | Do | do | do | 4 - amino - 4' - hydroxy - 2'-methylazo-benzene | Do. |
| (11) | Do | do | do | 4 - amino - 4' - hydroxy - 2'-5'-dimethyl-azobenzene | Do. |
| (12) | Do | 1:4 - dimethyl - 2 - aminobenzene | do | 4 - amino - 4' - hydroxyazo-benzene - 3' - carboxylic acid | Do. |
| (13) | Do | do | do | do | Do. |
| (14) | Do | 2-amino-1:4-dimethoxybenzene | do | do | Monomethylamine. |
| (15) | Do | do | do | 3-amino-4'-hydroxyazo-benzene-3'-carboxylic acid | Monomethylaniline. |

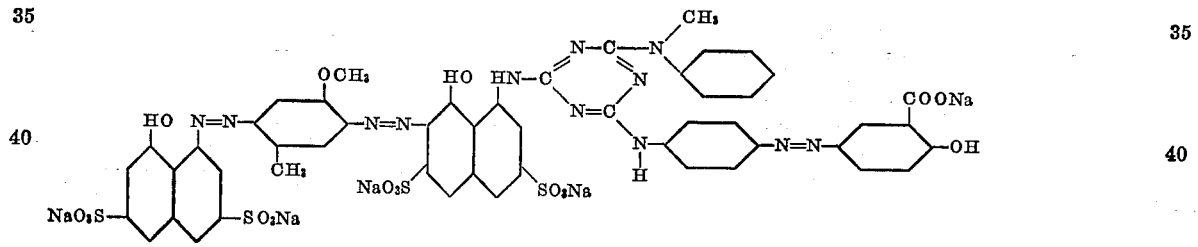

The formulas of some of the dyestuffs of the above table are as follows:—

No. 5

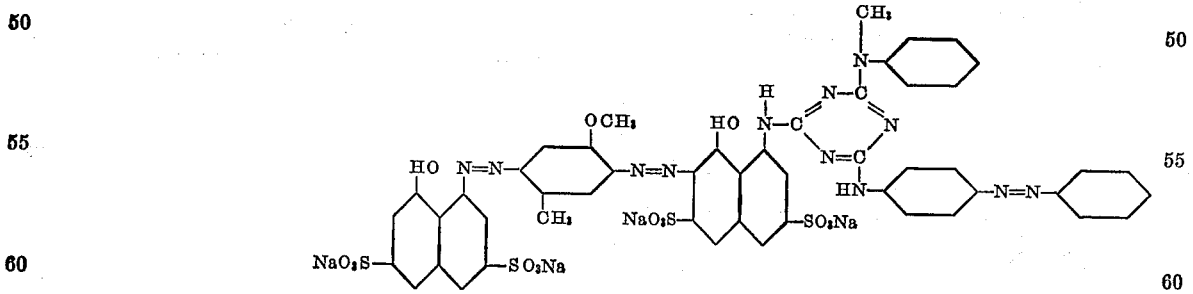

No. 6

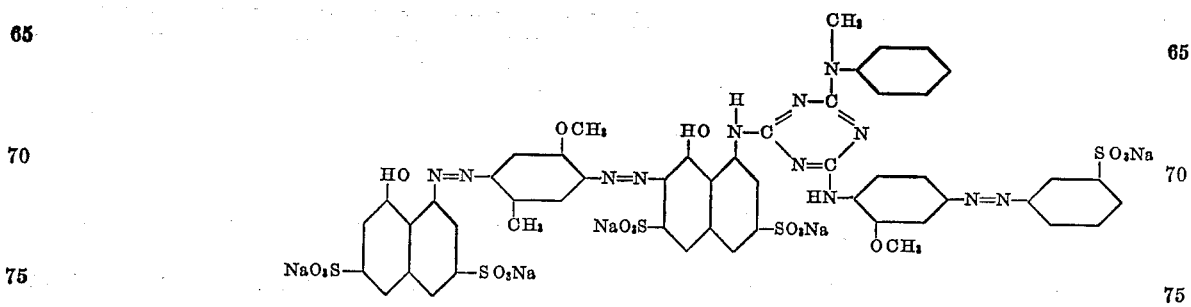

*No. 12*

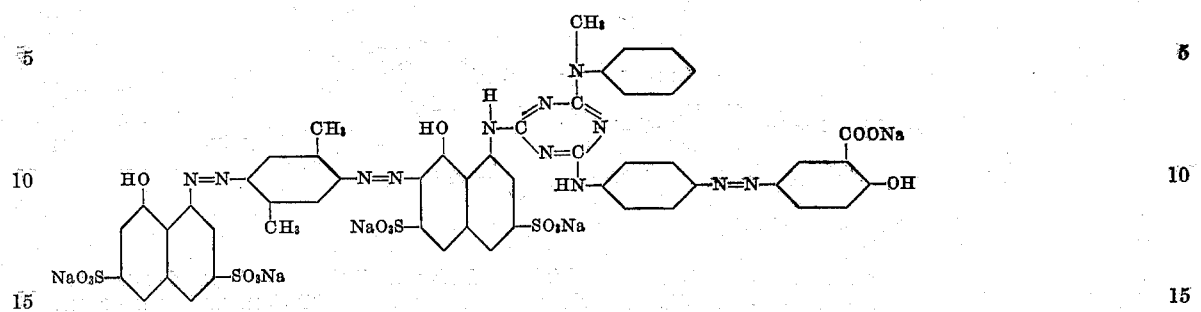

*No. 14*

What we claim is:—

1. The green direct dyeing azo-dyestuffs fast to light which are insensible in the dye-bath towards hard water and correspond to the general formula in which one $z$ represents an $SO_3Na$-group and the other $z$ represents a hydrogen atom, $y$ and $x$ represent a substituent selected from the group consisting of alkyl and alkoxy, $R_1$ stands for alkyl, $R_2$ stands for a member of the group consisting of hydrogen, alkyl and aryl of the benzene and naphthalene series, and $R_3$ and $R_4$ stand for radicals of the benzene series, which products constitute dark powders, are soluble in water to green solutions, and dye cotton or regenerated cellulose green tints which are fast to light.

2. The green direct dyeing azo-dyestuffs fast to light which are insensible in the dye-bath towards hard water and correspond to the general formula in which $R_1$ stands for alkyl, $R_2$ stands for a member of the group consisting of hydrogen, alkyl and aryl of the benzene and naphthalene series, and $R_3$ and $R_4$ stand for radicals of the benzene series, which products constitute dark powders, are soluble in water to green solutions, and dye cotton or regenerated cellulose green tints which are fast to light.

3. The green, direct dyeing azo-dyestuff fast to light which, on the one hand, is insensible in the dyebath towards hard water, and, on the other hand, corresponds to the general formula

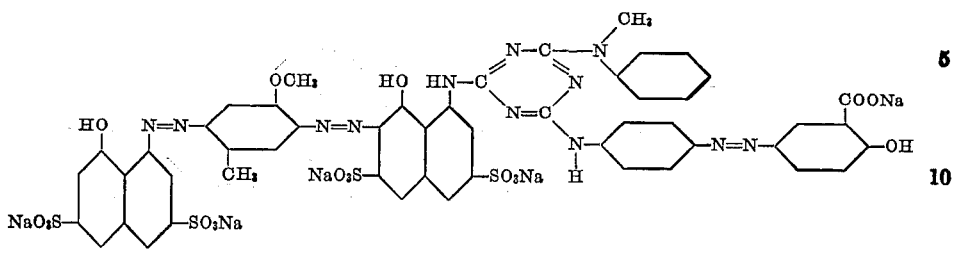

which product constitutes a dark powder, is soluble in water to a green solution, and dyes cotton or regenerated cellulose green tints which are fast to light.

JOSEPH GYR.
OTTO KAISER.